Sept. 21, 1943.  A. C. ORKFRITZ  2,329,937
ELECTRIC BROILING DEVICE
Filed June 8, 1940   3 Sheets-Sheet 1

INVENTOR.
Albert C. Orkfritz
BY Frank J. Schraeder Jr.
ATTORNEY.

Sept. 21, 1943. A. C. ORKFRITZ 2,329,937
ELECTRIC BROILING DEVICE
Filed June 8, 1940 3 Sheets-Sheet 2
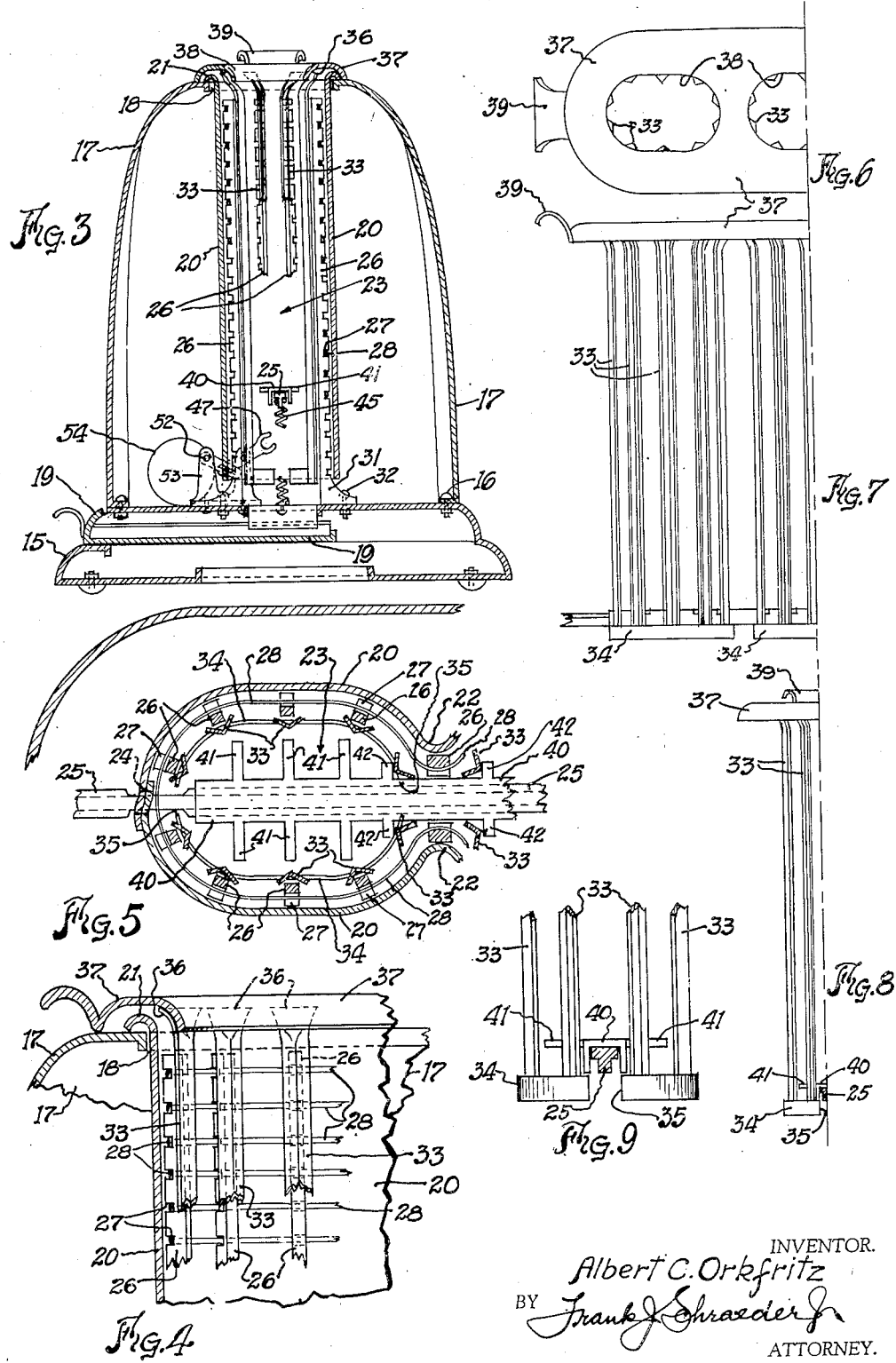
INVENTOR.
Albert C. Orkfritz
BY Frank J Schraeder Jr
ATTORNEY.

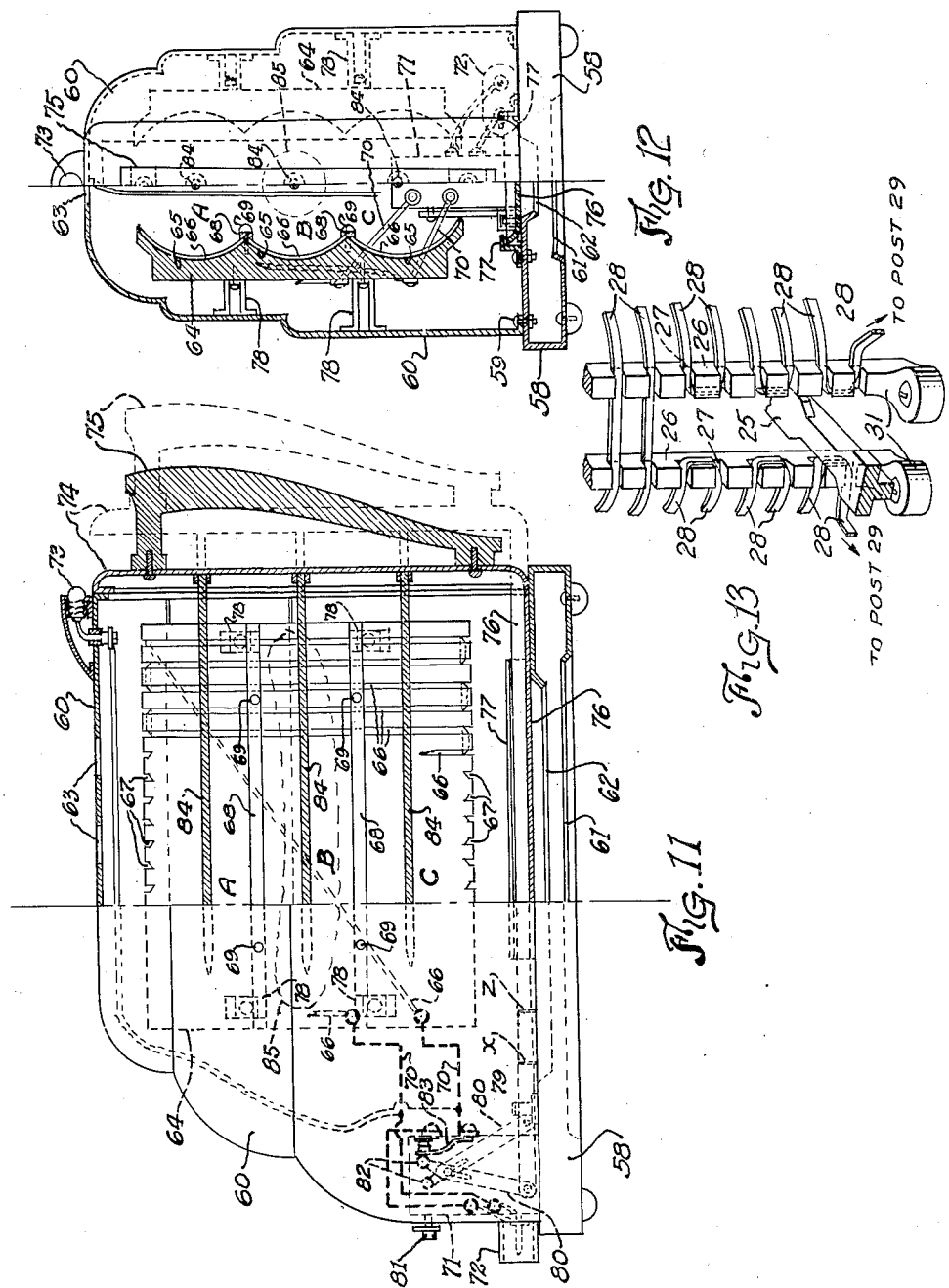

Patented Sept. 21, 1943

2,329,937

UNITED STATES PATENT OFFICE 2,329,937

ELECTRIC BROILING DEVICE

Albert C. Orkfritz, Elgin, Ill.

Application June 8, 1940, Serial No. 339,415

8 Claims. (Cl. 219—19)

This invention relates generally to new and useful improvements in electric broiling devices and has particular reference to a novel and, preferably portable, electric broiler for sausages and the like having one or more tubularly arranged open electric grills adapted in operation to simulate broiling grills of the open fire type such as wood, coal or charcoal grills.

One of the objects of my invention is to provide an electric grill having one or more open grill compartments which are adapted to receive one or more sausages therein for broiling whereby sausages, such as frankfurters or wienerwurst, and the like, may be broiled, browned, or even charred by being subjected to the direct action of intense heat rays emanating directly from an electric heating element or elements.

Another object of my invention is to provide a portable electrically-operated broiler for sausages and the like having a plurality of open grill compartments removably positioned, preferably as a unit, within an elongated oval-like vertically coiled electrically heated filament.

Still another feature of my invention resides in the arrangement of the sausage-supporting grills and of the heat producing filament whereby the vertical grill members of each open grill compartment are spaced to provide supports at multiple points of the sausage sides and wherein laterally spaced opposite portions of the laterally extending filament are brought inwardly toward one another to form tubular oval-like adjacent broiling compartments so that practically all side portions of the sausages are subjected to the direct broiling action of the intense heat of such tubularly arranged filament portions which practically surround the tubular grill compartments.

With the above and other objects in view, which will become readily apparent from the perusal of the following specification and attached drawings, wherein is shown a preferred embodiment of my invention, my invention consists in in the novel combination, construction and arrangement of the parts and members illustrated in the attached drawings, described in the following specification, and particularly pointed out in the appended claims.

In the drawings:

Fig. 3 is a vertical cross-section through the broiler shown in Fig. 1;

Fig. 4 is an enlarged half portion of the upper part of the broiler shown in the vertical longitudinal section in Fig. 2;

Fig. 5 is an enlarged partial horizontal section through one end of the broiler, showing the grill, electrically heated filament and its support, the shield, and the outer shell of the broiler housing;

Fig. 6 is a half plan view of the grill;

Figs. 7 and 8 are respectively half side and half end elevations of the grill;

Fig. 9 is an enlarged detail cross-section of the sausage lifting bar and its stationary support;

Fig. 11 shows a half side elevation and half longitudinal section of a broiler embodying a modification of my invention;

Fig. 12 shows a half end elevation and cross-section of the broiler shown in Fig. 11, and Fig. 13 is an illustrative detail showing the clearance in the heating filament winding, at the ends of the broiler, for the lifting bar.

Figure 1:
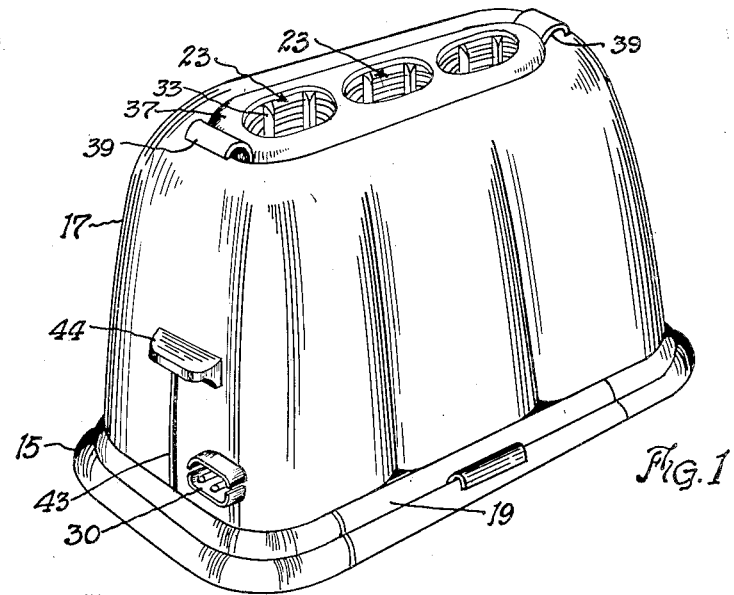
Fig. 1 is a perspective view of a broiler embodying my invention.

Referring to the illustrations, my improved broiler, as herein preferably shown, consists of a suitable, preferably cast iron, base 15 to the upper face of which is suitably secured, as by bolts 16, a shell-like housing 17 which is open at its lower end and also provided with an elongated oval-like opening 18.

The base member 15 is provided with a removable slidably mounted grease tray 19.

Insertable through opening 18 and supported on top of its marginal rim is a shield 20, preferably made of sheet metal, having a curved rim 21 at its upper and disposed over the top of the housing 17.

The shield 20, in the installation shown herein, is of a general oval-like tubular form to fit into the oval opening 18 within the top of the housing 17, however, spaced intermediate oppositely disposed wall portions 22 of the shield sides are brought inwardly toward one another to define interconnected tubular broiling compartments 23 each of preferably oval cross-section, and the opposite lower end portions are provided with openings 24 for a lifting bar 25.

Within the shield 20 is a plurality of vertical filament supports 26 of electrically non-conductive material such as for example porcelain, spaced about the inside of the oval-like tubular walls of the shield 20.

The vertical spaced filament supports 26 have one face slightly spaced from the inner face of the shield 20 and such face is provided with a plurality of vertically spaced recesses or notches 27 which are adapted to receive therein the filament 28 which is trained around these supports 26 and the terminal ends of which are connected to the contact posts 29 which are connected with the electric socket 30 adapted to receive a suitable connection plug of an electric power conductor.

The supports 26 are provided with enlarged lower ends 31 which are supported on the top of the base 15 and are secured thereto by suitable screws 32.

It will now be readily apparent that the supports 26 and the filament 28 trained about said supports, as shown in the drawings, define three oval broiling compartments 23.

A metal grill is provided which preferably is of cast iron and, as herein shown in the drawings, this grill consists of a plurality of comparatively narrow elongated spaced grill members 33 which are disposed in parallel alignment with and adjacent to the inner faces of the filament supports 26. The lower ends of each compartment group of grill members 33 are connected by a split collar 34 having end aligned openings 35 to permit the movement of the lifting bar 25 therethrough.

Similar openings are provided in the heating filament windings at the grill ends above the collar openings 35 to provide clearance for the movable lifting bar 25, as illustrated in Fig. 13.

The upper end portions of the grill members 33 are preferably formed with flattened arcuate portions 36 which are connected to the elongated metal cover 37, as by welding, and which cover is formed with a plurality of elongated oval openings 38 concentric with the oval tubular broiling compartments 23 defined by the grill members 33.

The cover 37 is formed with integral end handles 39.

As preferably shown in the drawings, the grill members 33 are formed of a V-shaped cross-section between their lower and upper end portions to thereby present line contacts with the sausage inserted therebetween. The angular faces of such grills provide heat-deflecting faces and the line contacts presented for contact with the sausage sides overcome any possible tendency of the sausage to stick to these hot grills. Obviously, the grill may be made from cast iron or stamped sheet metal and the grills 33 could be made of flat members of rectangular or other suitable cross-section.

Any suitable sausage lifting or ejecting mechanism controlled entirely manually or by any suitable time or thermostatically controlled power-driven mechanism may be provided for simultaneously raising the broiled sausages partly out of the grill compartments 23 to facilitate their complete removal by the operator.

The herein illustrated lifting mechanism consists of the sausage-supporting elongated metallic member 40 preferably of channel cross-section and substantially of a length almost equal to the length of the three broiling compartments. This member 40 is loosely mounted over the lifting bar 25 and preferably is formed with a plurality of lateral integral prongs 41 disposed within the compartments 23 as additional supports for the sausages, and is retained against longitudinal displacement by the engagement of the intermediate sets of prongs 42 with the grill member 33.

The lifting bar 25 is, as shown on the drawings, preferably of T cross-section and the end portions, which extend through the end compartment shield walls, are of decreased width to pass through the vertical slots 24.

The extreme ends of the bar 25 extend through vertical slots 43 within the shell 17 and are provided with suitable handles 44.

The lifting bar 25 and the sausage-supporting member 40 loosely mounted thereon are supported in normal raised position by a pair of coil springs 45 the upper ends of which engage about a spaced portion of the web portion of the bar 25 and their lower ends are positioned about the lug 46 secured to the base top.

Assuming that an electric current conductor is plugged into socket 30 to heat the filament 28 and that frankfurters are placed within the three compartments 23, the same may then be lowered into broiling positions within the compartments 23 by grasping the handles 44 and lowering the bar 25 with the supporting member 40.

In such lowering movement, the bar 25 will engage, with spaced side portions of its flange, within the forked ends 47A of a pair of arms 47 which are pivotally mounted on pins 48A in the supports 48.

The arms 47 each carry a pin 49 which ends into pivotal connection within the slot 50 of the arm 51 and both of the arms 51 are rigidly secured to a shaft 52 which is oscillatable with the arms 51 and supported on the upstanding bearings 53.

Figure 2:
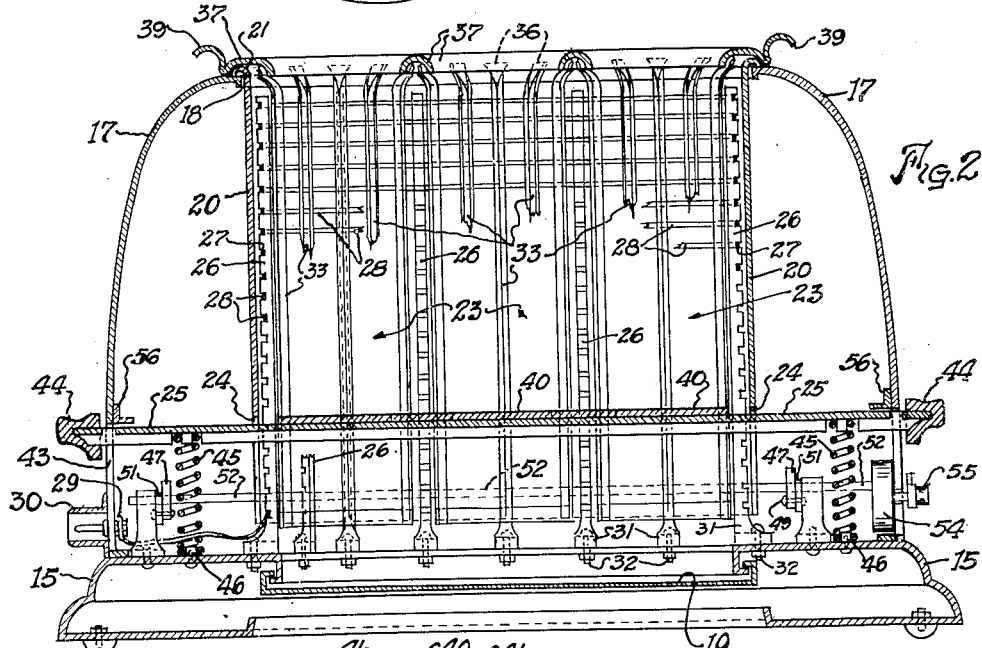
Fig. 2 is a longitudinal vertical section through the broiler shown in Fig. 1.
Figure 10:
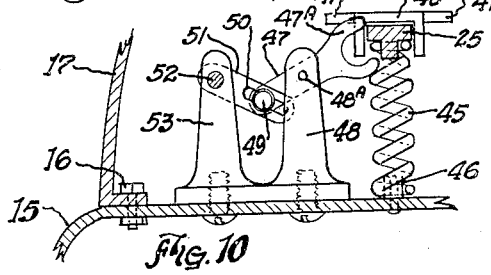
Fig. 10 is a vertical section through a portion of the time-controlled sausage lifting bar mechanism.

In the downward movement of the bar 25, the forked ends 47A of the arms 47 will be engaged by the flange of bar 25 and moved downwardly while their opposite ends and the arms 51 will be moved upwardly to thereby cause a partial rotation of shaft 52 one end of which shaft 52 is extended into a clock-controlled operator of any suitable design generally indicated by numeral 54. The rotation of shaft 52 will wind up a clock spring within the operator 54 and the clock mechanism therein will retain or lock the shaft 52 against released reverse movement until a timed release mechanism releases the shaft 52 for reverse rotation to permit the springs 45 to raise the lifting bar 25 and the support 40 with the broiled frankfurters thereon to the normal raised position as shown in Figs. 2, 3 and 10.

The numeral 55 indicates a rotatable knob for selectively setting the timed release mechanism.

The lifting bar 25 is held in the proper raised position in abutment with a pair of angle iron stops 56 by the two springs 45.

In the modification of my invention illustrated in Figs. 11 and 12, I have adapted my invention to a horizontal type of broiler which includes a suitable hollow base 58 onto which is secured, as by the bolts 59, the hollow ornate casing or housing 60.

The hollow base 58 is provided with elongated openings 61 and 62 to provide for venting of the gases from within the casing 60 through openings 63 in the top thereof.

The interior of the casing 60 is provided with three longitudinally disposed superposed broiling compartments A, B and C defined by a pair of spaced opposed walls 64 of electrically non-conductive material such as, for example, porcelain.

The opposite faces 65 of the walls 64 are preferably formed of arcuate shape so as to form somewhat cylindrical walls for the broiling chambers A, B and C.

The walls 64 support the filaments 66 which are hooked into notches 67 in the upper and lower edges of the walls 64 and these filaments are also secured to the longitudinal ridges between the arcuate faces 65 by porcelain strips 68 removably attached by screws 69.

The terminals of the filaments are electrically connected by the conductors 70 to a suitable clock-controlled device generally indicated by 71.

A suitable electric connection socket 72 is provided which is adapted to receive a suitable connection plug of an electric power conductor for supplying electric current to the broiler filaments and clock-controlled device 71.

A suitable electric pilot light 73 is provided for indicating the closed position of the electric switch which controls the filaments.

The walls 64 are supported on U-shaped brackets 78 suitably removably secured to the inside face of the casing 60.

The casing 60 is open at one end only and at such end is provided with a cover 74 which has secured thereto a suitable handle 75. The cover 74 is formed with an integral drip pan 76, at its lower end, which is guided and retained between a pair of Z-bars 77 secured to the top of the base 58.

The pan 76 is arranged below the superposed chambers A, B and C to receive therein the fat drippings from the broiled sausages, and the inner end X of this pan is in abutment with pushers 79 which are located one on each side of the clock-controlled device 71. Each pusher 79 is pivotally connected to a link 80 operable by the clock-controlled mechanism in the device 71.

The broiler is provided with suitable means for supporting sausages, or the like, within the central portions of the chambers A, B and C where same shall be exposed to heat rays emanating directly from the heated filaments 66. I have illustrated a preferred form of such supports in the form of pointed elongated pin-like members 84 which are secured at their rear end to the closure cover 74. A sausage 85, indicated by broken lines in the broiling chamber B, is shown threaded upon the pin-like member 84.

The device 71 is provided with a control knob 81 for selectively setting the time-controlled mechanism.

When knob 81 is set for operation of the broiler, the spring in the device 71 is wound up by the rotation of knob 81. The insertion of the sausage-loaded closure cover 74 into the casing 60 will move the links 80 rearwardly, and in such rearward movement of the links 80, an upper extension 82 on one of such links 80 is brought in engagement with switch 83 to close the electric circuit which energizes the filaments 66 and the pilot light 73.

When the period of time set by the knob 81 has elapsed the clock mechanism in the device 71 will act to move the links 80 forwardly to thereby cause a forward movement of the pushers 79 which will engage the inner end of the pan 76 and move same outwardly of the casing to about the point Z. In such outward movement of the pan 76 and closure-cover 74, the upper switch operating end 82 will be disengaged from the switch 83 to permit it to move into open position to open the circuit to the filaments 66 and pilot light 73 whereupon the cover 74 may be manually withdrawn to permit removal of the broiled sausages.

I claim:

1. In an electric broiler for sausages and the like, a movable support disposed below the sausage, a tubular grill of oval cross-section, an electric heat-emitting filament, and means for supporting said filament disposed about the outer face of said grill, said grill being composed of laterally spaced vertically disposed bars adapted to retain a sausage in position on said support subject to broiling by the direct unobstructed impingement thereon of intense heat rays emanating directly from said heat-emitting filament through the openings between said spaced grill bars.

2. In an electric broiler for sausages and the like, as embodied in claim 1 and including means for raising said movable support to raise the broiled sausage partly out of the grill to facilitate its complete removal therefrom.

3. In an electric broiler for sausages and the like, a support, a plurality of substantially circularly arranged vertically disposed spaced grill members, a shield disposed about the outer sides of said grill members, an electric heat-emitting filament disposed between said grill members and said shield, and a plurality of electrically non-conductive laterally spaced vertical members supporting said filament and each positioned between one of said grill members and said shield, said grill being adapted to retain a sausage in position on said support subject to broiling by the direct unobstructed impingement thereon of intense heat emanating directly from said heat-emitting filament.

4. In an electric broiler for sausages and the like, a group of adjacently positioned grills, each of said grills including a plurality of substantially circularly arranged vertically disposed spaced grill members defining an individual sausage compartment, a vertical tubular plate shield disposed about the outer sides of said group of grills, said plate shield having inwardly bent opposite side portions disposed between the individual grill compartments, an electric heat-emitting filament disposed about said group of grills positioned between said grill members and said plate shield, a plurality of electrically non-conductive vertically disposed members each positioned adjacent the outer side of a grill member and between such grill member and said plate shield for supporting said filament, and supporting means at the lower end of each grill compartment adapted to support a sausage.

5. In an electric broiler as embodied in claim 4 and wherein said supporting means comprises a single movable member extending through the lower ends of said grill compartments and adapted to be moved to simultaneously raise all of the sausages partially out of said compartments to facilitate their removal.

6. In an electric broiler as embodied in claim 4 and including said grill members having a V-shaped cross-section.

7. In an electric broiler as embodied in claim 4 and including said supporting means comprising a member mounted for vertical movement in the lower end of the grill, and means for raising said member.

8. In an electric broiler as embodied in claim 4 and including said supporting means comprising a single movable support member extending laterally through the lower ends of said grill compartments and adapted to simultaneously raise all of the sausages partially out of said compartments, spring-pressed means normally retaining said support member in raised position, manually-operable means for lowering said support member, and time-controlled means for retaining said support member in lowered position against the pressure of said spring-pressed means for a predetermined period of time and automatically releasing said support member to permit said spring-pressed means to raise said support member, said time-controlled means including a clock-controlled mechanism adapted to engage said support member after same has been manually lowered, said time-controlled mechanism being automatically operable to release said support member.

ALBERT C. ORKFRITZ.